US012578716B2

(12) United States Patent　　　(10) Patent No.:　US 12,578,716 B2
　　　Cheim　　　　　　　　　　　　(45) Date of Patent:　　Mar. 17, 2026

(54) CONFIGURABLE FAULT TREE STRUCTURE FOR ELECTRICAL EQUIPMENT

(71) Applicant: Hitachi Energy Ltd, Zürich (CH)

(72) Inventor: Luiz Cheim, Raleigh, NC (US)

(73) Assignee: HITACHI ENERGY LTD, Zürich (CH)

( * ) Notice: Subject to any disclaimer, the term of this patent is extended or adjusted under 35 U.S.C. 154(b) by 365 days.

(21) Appl. No.: 18/034,410

(22) PCT Filed: Dec. 4, 2020

(86) PCT No.: PCT/EP2020/084705
　　　§ 371 (c)(1),
　　　(2) Date: Apr. 28, 2023

(87) PCT Pub. No.: WO2022/111840
　　　PCT Pub. Date: Jun. 2, 2022

(65) Prior Publication Data

US 2024/0019859 A1　　Jan. 18, 2024

Related U.S. Application Data

(60) Provisional application No. 63/118,383, filed on Nov. 25, 2020.

(51) Int. Cl.
　　　*G05B 23/02* 　　　(2006.01)
　　　*G06Q 10/20* 　　　(2023.01)
　　　(Continued)

(52) U.S. Cl.
　　　CPC ..... *G05B 23/0248* (2013.01); *G05B 23/0275* (2013.01)

(58) Field of Classification Search
　　　CPC ............ G05B 23/0248; G05B 23/0275; G05B 23/0283; G05B 23/024; G05B 23/0286;
　　　(Continued)

(56) References Cited

U.S. PATENT DOCUMENTS 6,076,083 A * 6/2000 Baker ..................... G06N 7/01
　　　　　　　　　　　　　　　　　　　　　706/45
2005/0015217 A1 * 1/2005 Weidl .................... G05B 17/02
　　　　　　　　　　　　　　　　　　　　　702/185
(Continued)

FOREIGN PATENT DOCUMENTS

CN　　　110245373 A　　9/2019
EP　　　2770388 A1　　8/2014
(Continued)

OTHER PUBLICATIONS

Cheim, et al."Probabilistic transformer fault tree analysis using Bayesian networks," 2014 IEEE PES T&D Conference and Exposition, Apr. 14, 2014, 5 pages (Year: 2014).*
(Continued)

*Primary Examiner* — Jeffrey P Aiello
(74) *Attorney, Agent, or Firm* — Sage Patent Group

(57)　　　ABSTRACT

Embodiments are disclosed for adjusting at least one probability value for a subset of interconnected nodes of a configurable fault tree structure. The at least one probability value is associated with a state of at least one component of a first electrical equipment, and the configurable fault tree structure represents at least one failure mode relating to the at least one component. The adjusting is based on at least one of a detected state of the at least one component of the first electrical equipment and observed faults in a plurality of electrical equipment. Thereafter, generating an indication of the state of the at least one component based on the one or more adjusted probability values.

19 Claims, 14 Drawing Sheets

(51) Int. Cl.
*H01M 4/62* (2006.01)
*H04N 19/96* (2014.01)

(58) Field of Classification Search
CPC .............. G05B 23/0289; G05B 23/02; G05B 23/0205; G05B 23/0267; G05B 19/4185; G05B 19/042; G05B 19/4184; G05B 13/028; G05B 13/0285; G05B 13/027; G05B 13/029; G05B 2219/31357; G06N 7/01; G06N 20/00; G06N 3/02; G06F 17/18; G06F 18/21; G06F 18/2178; G06F 18/25; Y04S 10/30
USPC .... 324/500, 512; 700/83, 108, 17, 286, 291, 700/110; 702/183, 188, 181, 182, 179, 702/62, 184, 58, 185, 59, 127, 81, 108, 1; 703/2
See application file for complete search history.

(56) References Cited

U.S. PATENT DOCUMENTS

| | | | | |
|---|---|---|---|---|
| 2007/0011113 A1* | 1/2007 | Mosleh | ..................... | G06N 7/01 |
| | | | | 706/14 |
| 2016/0358106 A1* | 12/2016 | Anderson | .............. | G06N 20/00 |

FOREIGN PATENT DOCUMENTS

| | | | | |
|---|---|---|---|---|
| JP | H06332529 A | | 12/1994 |
| JP | H08292811 A | * | 11/1996 |
| JP | 2012003406 A | | 1/2012 |
| JP | 2019012316 A | | 1/2019 |
| JP | 2019178625 A | | 10/2019 |
| WO | 2020161835 A1 | | 8/2020 |

OTHER PUBLICATIONS

Jakobs, et al "Configurable Fault Trees," Operating Systems Group, TU Chemnitz, Chemnitz, Germany, Springer International Publishing Switzerland, 2016, 15 pages. (Year: 2016).*
First Office Action, CN Patent Application No. 202080107147.4, mailed Feb. 28, 2025, 11 pages.
Notice of Reasons for Refusal, Japanese Patent Application No. 2023-531517, mailed May 29, 2024, 10 pages.
International Search Report and Written Opinion of the International Searching Authority, PCT/EP2020/084705, mailed Aug. 10, 2021, 15 pages.
Jakobs, et al "Configurable Fault Trees," Operating Systems Group, TU Chemnitz, Chemnitz, Germany, Springer International Publishing Switzerland, 2016, 15 pages.
Cheim, et al "Probabilistic transformer fault tree analysis using Bayesian networks," 2014 IEEE PES T&D Conference and Exposition, Apr. 14, 2014, 5 pages.

* cited by examiner $$P(A,B) = P(A|B).P(B) = P(B|A).P(A)$$

BAYES' RULE:

$$P(A|B) = \frac{P(B|A).P(A)}{P(B)}$$

(RULE OF CONDITIONAL PROBABILITY)

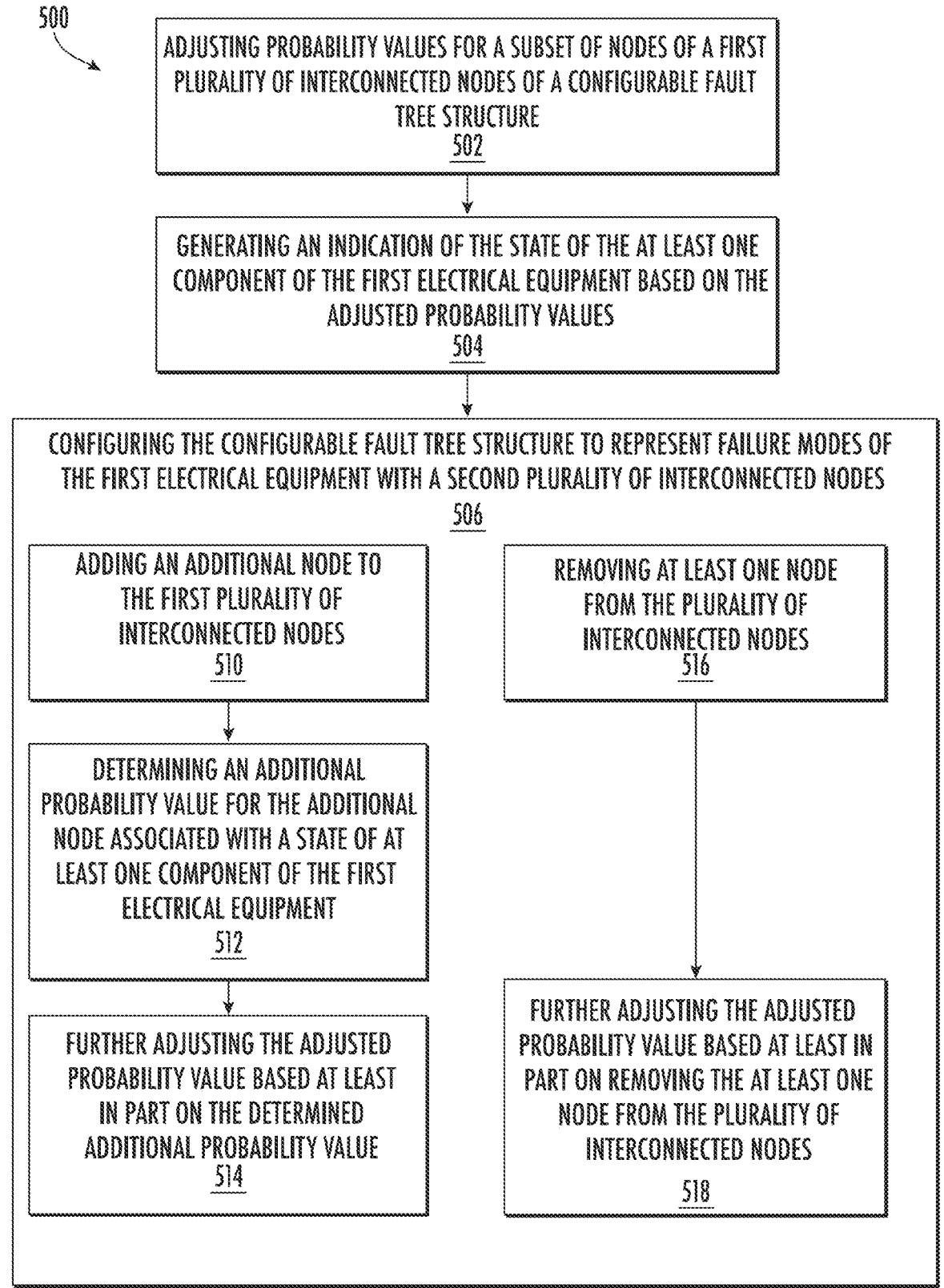

500

ADJUSTING PROBABILITY VALUES FOR A SUBSET OF NODES OF A FIRST PLURALITY OF INTERCONNECTED NODES OF A CONFIGURABLE FAULT TREE STRUCTURE
502

GENERATING AN INDICATION OF THE STATE OF THE AT LEAST ONE COMPONENT OF THE FIRST ELECTRICAL EQUIPMENT BASED ON THE ADJUSTED PROBABILITY VALUES
504

CONFIGURING THE CONFIGURABLE FAULT TREE STRUCTURE TO REPRESENT FAILURE MODES OF THE FIRST ELECTRICAL EQUIPMENT WITH A SECOND PLURALITY OF INTERCONNECTED NODES
506

ADDING AN ADDITIONAL NODE TO THE FIRST PLURALITY OF INTERCONNECTED NODES
510

REMOVING AT LEAST ONE NODE FROM THE PLURALITY OF INTERCONNECTED NODES
516

DETERMINING AN ADDITIONAL PROBABILITY VALUE FOR THE ADDITIONAL NODE ASSOCIATED WITH A STATE OF AT LEAST ONE COMPONENT OF THE FIRST ELECTRICAL EQUIPMENT
512

FURTHER ADJUSTING THE ADJUSTED PROBABILITY VALUE BASED AT LEAST IN PART ON THE DETERMINED ADDITIONAL PROBABILITY VALUE
514

FURTHER ADJUSTING THE ADJUSTED PROBABILITY VALUE BASED AT LEAST IN PART ON REMOVING THE AT LEAST ONE NODE FROM THE PLURALITY OF INTERCONNECTED NODES
518

FIG. 5A

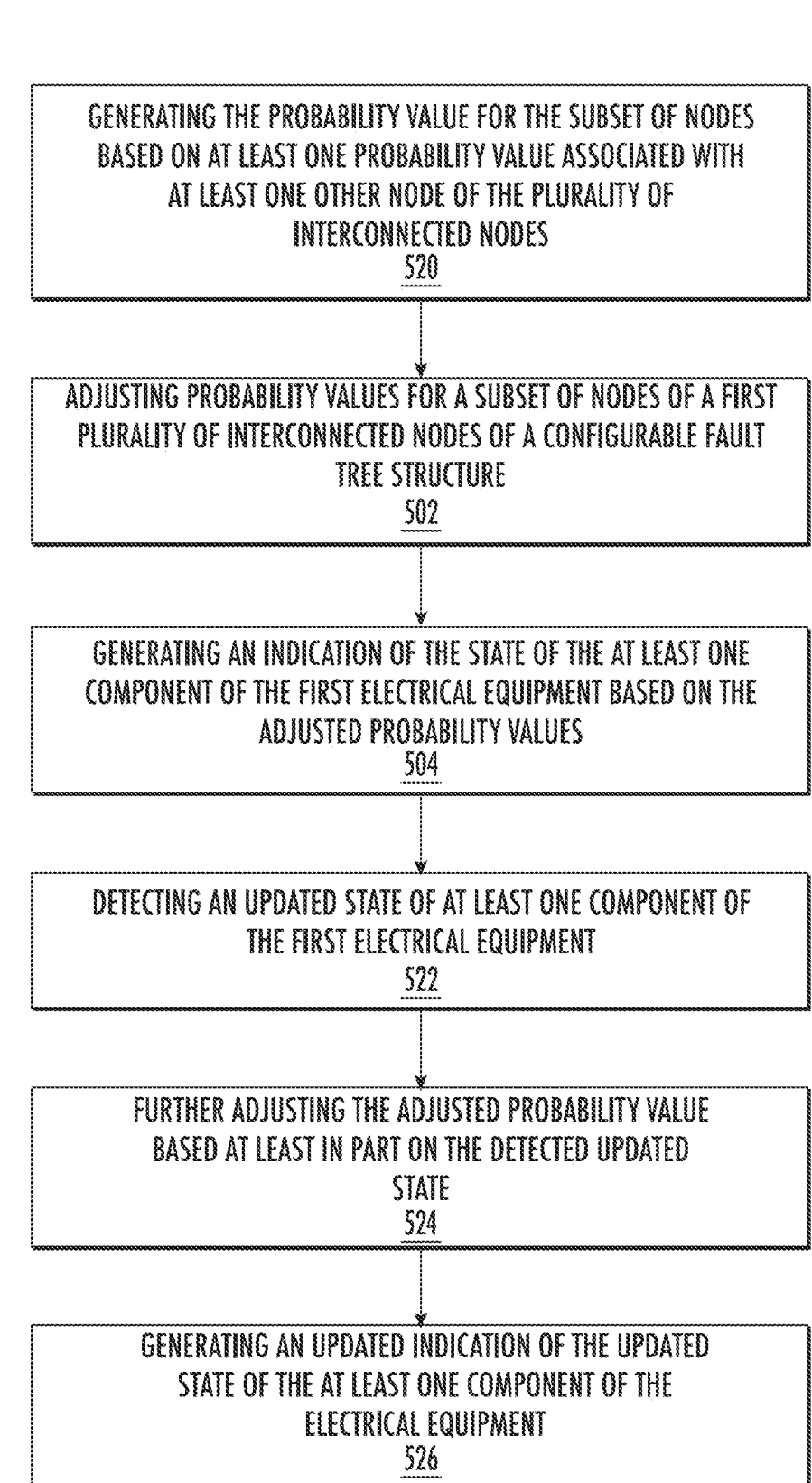

500

GENERATING THE PROBABILITY VALUE FOR THE SUBSET OF NODES
BASED ON AT LEAST ONE PROBABILITY VALUE ASSOCIATED WITH
AT LEAST ONE OTHER NODE OF THE PLURALITY OF
INTERCONNECTED NODES
520

ADJUSTING PROBABILITY VALUES FOR A SUBSET OF NODES OF A FIRST
PLURALITY OF INTERCONNECTED NODES OF A CONFIGURABLE FAULT
TREE STRUCTURE
502

GENERATING AN INDICATION OF THE STATE OF THE AT LEAST ONE
COMPONENT OF THE FIRST ELECTRICAL EQUIPMENT BASED ON THE
ADJUSTED PROBABILITY VALUES
504

DETECTING AN UPDATED STATE OF AT LEAST ONE COMPONENT OF
THE FIRST ELECTRICAL EQUIPMENT
522

FURTHER ADJUSTING THE ADJUSTED PROBABILITY VALUE
BASED AT LEAST IN PART ON THE DETECTED UPDATED
STATE
524

GENERATING AN UPDATED INDICATION OF THE UPDATED
STATE OF THE AT LEAST ONE COMPONENT OF THE
ELECTRICAL EQUIPMENT
526

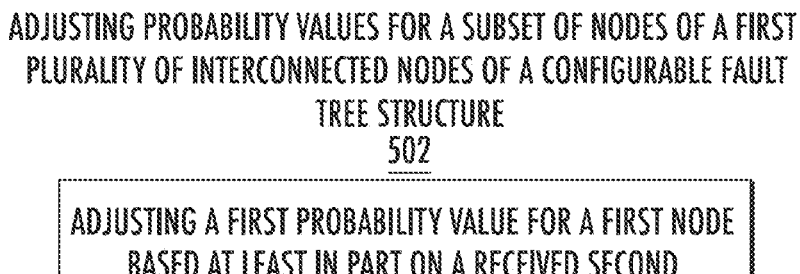

ADJUSTING PROBABILITY VALUES FOR A SUBSET OF NODES OF A FIRST
PLURALITY OF INTERCONNECTED NODES OF A CONFIGURABLE FAULT
TREE STRUCTURE
502

ADJUSTING A FIRST PROBABILITY VALUE FOR A FIRST NODE
BASED AT LEAST IN PART ON A RECEIVED SECOND
PROBABILITY VALUE FOR A SECOND NODE
530

ADJUSTING THE SECOND PROBABILITY VALUE FOR THE
SECOND NODE BASED AT LEAST IN PART ON THE
ADJUSTED FIRST PROBABILITY VALUE FOR THE FIRST NODE
532

GENERATING AN INDICATION OF THE STATE OF THE AT LEAST ONE
COMPONENT OF THE FIRST ELECTRICAL EQUIPMENT BASED ON THE
ADJUSTED PROBABILITY VALUES
504

ADJUSTING AN OPERATIONAL STATE OF AT LEAST ONE COMPONENT
OF THE FIRST ELECTRICAL EQUIPMENT BASED AT LEAST IN PART ON THE
INDICATION
534

CONFIGURABLE FAULT TREE STRUCTURE FOR ELECTRICAL EQUIPMENT

CROSS REFERENCE TO RELATED APPLICATIONS

This application is a 35 U.S.C. § 371 national stage application of PCT International Application No. PCT/EP2020/084705 filed on Dec. 4, 2020, which in turn claims priority to U.S. Provisional Application No. 63/118,383, filed on Nov. 25, 2020, the disclosures and content of which are incorporated by reference herein in their entirety.

BACKGROUND

The present disclosure relates to analysis of electrical equipment, such as high voltage transformers. In particular, the present disclosure relates to configurable fault tree structures for prognosis of electrical equipment.

Fault analysis and prediction for electrical equipment, such as for high voltage transformers, is highly valuable for determination of equipment condition and in the ranking of conditions of a large number of equipment when performing condition assessment of a given fleet. Existing solutions may be based on individual and institutional expertise, and may contain proprietary formulas, look up tables and expert rules. One drawback of this approach is that the proprietary nature of the solution may prevent the rules and functions from being shown to customers and/or users of the electrical equipment. As a result, the resulting models may be deployed to customers as a "black box" hardware or software product, while the highly valuable underlying engineering models, which may be based on many years of experience on assessing transformer condition by experts, remain proprietary.

Many customers, such as large utilities for example, have additional resources that could be used to improve and customize these proprietary models, such as engineering expertise, in-house materials laboratories, repair shops, and/or groups of professionals exclusively dedicated to research and development, etc. Thus, there is a need for an open solution that does not rely on proprietary formulas, and that can be adopted, dynamically updated and customized for the needs of different customers and end users.

SUMMARY

According to some embodiments, a method includes adjusting, by a processor circuit, at least one probability value associated with a state of at least one component of a first electrical equipment for a subset of nodes of a first plurality of interconnected nodes of a configurable fault tree structure. The fault tree represents at least one failure mode relating to the at least one component of the first electrical equipment. The adjusting is based on at least one of a detected state of the at least one component of the first electrical equipment and observed faults in a plurality of electrical equipment. The method further includes generating, by the processor circuit, an indication of the state of the at least one component of the first electrical equipment based on the at least one adjusted probability value.

According to some embodiments, the method further includes configuring the configurable fault tree structure to represent failure modes of the first electrical equipment with a second plurality of interconnected nodes.

According to some embodiments, configuring the configurable fault tree structure further includes adding, by the processor circuit, an additional node to the plurality of interconnected nodes, determining, by the processor circuit, an additional probability value for the additional node associated with a state of at least one component of the first electrical equipment, and adjusting, by the processor circuit, the adjusted probability value based at least in part on the determined additional probability value.

According to some embodiments, configuring the configurable fault tree structure further includes removing, by the processor circuit, at least one node from the plurality of interconnected nodes, and adjusting, by the processor circuit, the adjusted probability value based at least in part on removing the at least one node from the plurality of interconnected nodes.

According to some embodiments, the method further includes generating, by the processor circuit before adjusting the probability value, the probability value for the subset of nodes based on at least one probability value associated with at least one other node of the plurality of interconnected nodes.

According to some embodiments, the method further includes determining, by the processor circuit, whether the adjusted probability value meets a predetermined probability threshold, wherein generating the indication is further based on the adjusted probability value meeting the predetermined probability threshold.

According to some embodiments, the method further includes detecting, by the processor circuit, an updated state of at least one component of the first electrical equipment, and adjusting, by the processor circuit, the adjusted probability value based at least in part on the detected updated state.

According to some embodiments, the method further includes generating, by the processor circuit in response to the further adjusted probability value, an updated indication of the updated state of the at least one component of the electrical equipment.

According to some embodiments, adjusting the probability value further includes adjusting a first probability value for a first node of the plurality of interconnected nodes based at least in part on a received second probability value for a second node of the plurality of interconnected nodes, and adjusting the second probability value for the second node based at least in part on the adjusted first probability value for the first node.

According to some embodiments, the method further includes receiving, by a system comprising the processor circuit and a memory storing the fault tree structure, a first message from the first electrical equipment indicative of the state of the at least one component of the first electrical equipment, and transmitting, by the system, a second message comprising the indication to the first electrical equipment.

According to some embodiments, the method further includes adjusting an operational state of at least one component of the first electrical equipment based at least in part on the indication.

According to some embodiments, the method further includes receiving, by a system comprising the processor circuit and a memory storing the fault tree structure, a first message from the first electrical equipment indicative of a state of the at least one component of the first electrical equipment, wherein adjusting the probability value is further based at least in part on the first message. The method further includes receiving, by the system, a second message from a second electrical equipment indicative of a state of a second component of the second electrical equipment, and adjusting, by the processor circuit, a second probability value associated with the state of the second component based at least in part on the second message.

According to some embodiments, a system includes a processor circuit and a memory comprising machine readable instructions. When executed by the processor circuit, the machine readable instructions cause the processor circuit to adjust at least one probability value associated with a state of at least one component of a first electrical equipment for a subset of nodes of a first plurality of interconnected nodes of a configurable fault tree structure. The configurable fault tree structure represents at least one failure mode relating to the at least one component of the first electrical equipment. The adjusting is based on at least one of a detected state of the at least one component of the first electrical equipment and observed faults in a plurality of electrical equipment. The machine readable instructions further cause the processor circuit to generate an indication of the state of the at least one component of the first electrical equipment based on the at least one adjusted probability value.

According to some embodiments, the memory further comprises the fault tree structure.

According to some embodiments, the machine readable instructions further cause the processor circuit to configure the configurable fault tree structure to represent failure modes of the first electrical equipment with a second plurality of interconnected nodes.

According to some embodiments, the machine readable instructions further cause the processor circuit to generate, before adjusting the probability value, the probability value for the subset of nodes based on at least one probability value associated with at least one other node of the plurality of interconnected nodes.

According to some embodiments, the machine readable instructions further cause the processor circuit to determine whether the adjusted probability value meets a predetermined probability threshold, wherein generating the indication is further based on the adjusted probability value meeting the predetermined probability threshold.

According to some embodiments, a non-transitory computer readable medium comprising instructions that, when executed by a processor circuit, cause the processor circuit to adjust at least one probability value associated with a state of at least one component of a first electrical equipment for a subset of nodes of a first plurality of interconnected nodes of a configurable fault tree structure. The configurable fault tree structure represents at least one failure mode relating to the at least one component of the first electrical equipment. The adjusting is based on at least one of a detected state of the at least one component of the first electrical equipment and observed faults in a plurality of electrical equipment. The instructions further cause the processor circuit to generate an indication of the state of the at least one component of the first electrical equipment based on the at least one adjusted probability value.

According to some embodiments, the computer readable medium further comprises the fault tree structure.

According to some embodiments, the instructions further cause the processor circuit to configure the configurable fault tree structure to represent failure modes of the first electrical equipment with a second plurality of interconnected nodes.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 5A-5C are flowcharts of operations according to some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

According to some embodiments, a method includes adjusting at least one probability value associated with a node or a subset of interconnected nodes of a configurable fault tree structure. In this example, the at least one adjusted probability value may be associated with a state of at least one component of a first electrical equipment, and the configurable fault tree structure represents at least one failure mode relating to the at least one component. The adjusting may be based on at least one of a detected state, such as detection by means of processing measured data, of the at least one component of the first electrical equipment and observed faults in a plurality of electrical equipment. In this example, the method further includes generating an indication of the state of the at least one component based on the at least one adjusted probability value.

Fault tree structures may contain a plurality of interconnected nodes connected in a causal network, where a failure condition estimated in a child node is expected to lead to or cause a failure condition in a parent node. Fault tree structures may vary in complexity, depending on the nodes that can be computed based on measurements of condition related parameters and/or processing of information relating to a condition for one or more nodes, needs of the end user to monitor and/or avail diagnosis service, and may represent and prioritize the most important components and their respective modes of failure. In this manner, fault tree structures may be used with many types of electrical equipment, including transformers and circuit breakers, for example, as discussed in greater detail below.

Figure 1:
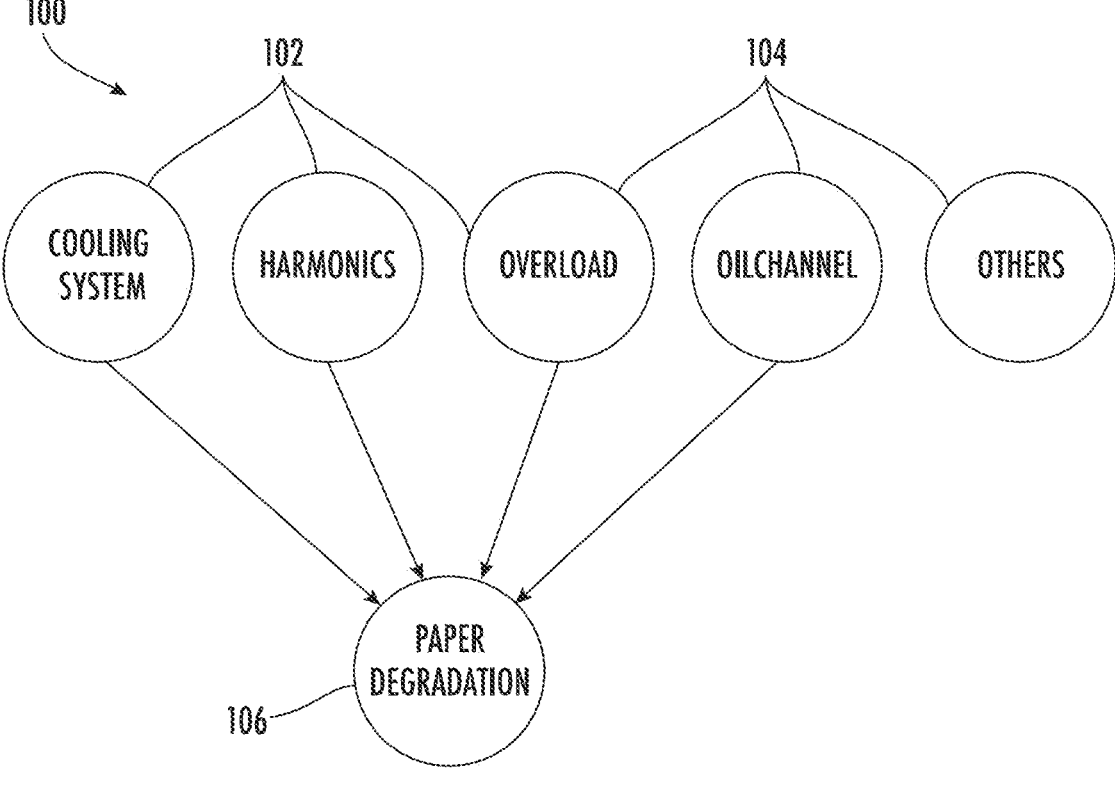
FIG. 1 is a diagram illustrating a simplified configurable fault tree structure, according to some embodiments.

A simplified fault tree structure 100, applicable to power transformers, is illustrated by FIG. 1. In the fault tree structure 100 of FIG. 1, for example, a plurality of interconnected nodes 102 includes a plurality of child nodes 104 connected to a common parent node 106. In this example, failures in any one of the illustrated child nodes 104, e.g. cooling system, harmonics, overload, oil channel, etc., may result in a fault condition in the paper degradation parent node 106. These causal relationships are built out into a more complex fault tree structure, such as the fault tree structure 200 illustrated in FIG. 2A, for example. In many examples, individual nodes 102 may affect multiple components of the electrical equipment. In this manner, a fault tree structure 100 provides a technically sound and easily understandable way to detect and measure fault conditions for customers and users of the electrical equipment.

As used herein, the terms "parent node" and "child node" refer to a respective node's relationship with another interconnected node in the fault tree structure. For example, the paper degradation node 106 of FIG. 1 may be referred to as a parent node to the child nodes 104, e.g. cooling system, harmonics, overload, oil channel, etc. In more complex, multi-layered fault tree structures, such as the fault tree structure 200 illustrated in FIG. 2A, for example, a child node can be a parent to another child node in the fault tree, and vice versa. As will be discussed in greater detail below, many embodiments include interconnected nodes that affect each other in both directions, such that a node may be a parent to another node in one context or orientation, and may be a child to the same node in another context or orientation. For clarity and ease of description of the disclosed embodiments herein, for a given pair of interconnected nodes, the node that is nearer to or at the root of the fault tree structure will be referred to, without limitation, as the parent node for that pair (e.g., parent node 106 of FIG. 1) and the node that is nearer to or at the edges of the fault tree structure will be referred to, without limitation, as the child node for that pair (e.g., child nodes 104 of FIG. 1).

Figure 2A:
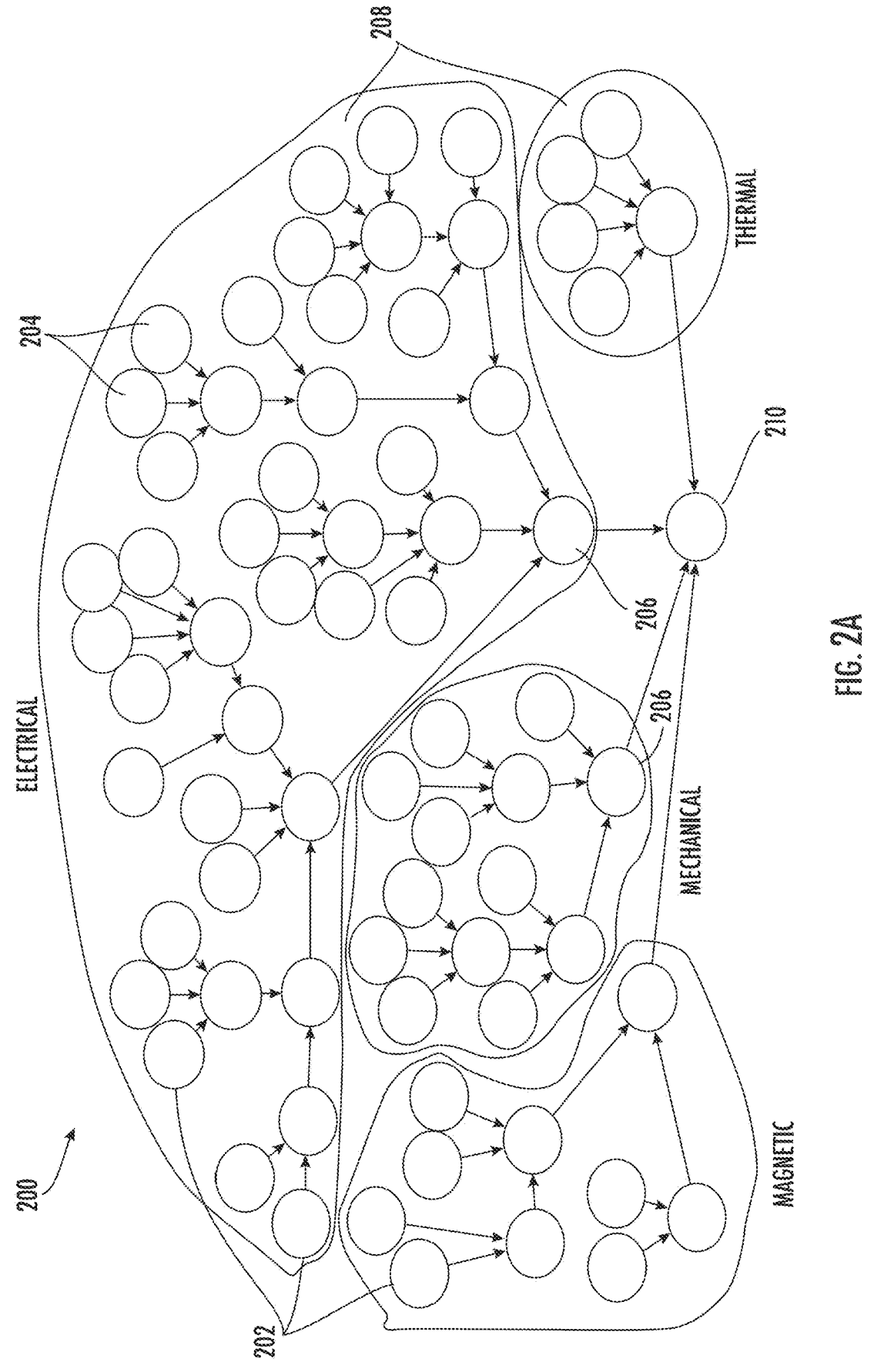
FIG. 2A is a diagram illustrating a configurable fault tree structure for a transformer having multiple sub-trees, according to some embodiments.

Referring now to FIG. 2A, a fault tree structure 200 may also be sub-divided into sub-trees 208 associated with different failure modes and/or sub-systems of the electrical equipment. For example, the fault tree structure 200 of FIG. 2A illustrates sub-trees 208 of nodes 202 (including respective parent nodes 206 and child nodes 204 for the respective sub-trees 208) grouped by types of failure modes for a transformer, e.g., magnetic, mechanical, electrical, thermal, etc. In other examples, sub-trees 208 may also be grouped by sub-system, e.g., pipes, main cabinet, tank walls, etc., by function, e.g., storage, manufacturing, maintenance, operations, etc., or other criteria. Such grouping helps in gathering one or more parts (one or more specific groups) of the fault tree structure 200 from a source (experts/service/utility companies, etc.) available and accessible to an electrical equipment monitoring system, and further adopted in the electrical equipment monitoring system, by properly associating the monitored data with respective child/leaf nodes of the accessed one or more parts of the fault tree structure 200.

The fault tree structure 200 and its sub-trees 208 may be utilized based on the availability of monitoring data (e.g., off line and/or online sensors) that provide the nodes 202 with input so that the nodes can provide indications when a given component is compromised, and determine whether other components, functions, or operations are affected or are likely to be affected. In this example, all branches, parent nodes, and child nodes of the fault tree structure 200 are interconnected, leading to the general failure node 210 at the root of the fault tree structure 200. In this manner, the parent nodes 206 for the respective sub-trees 208 are children of the general failure node 210.

Several approaches can be adopted to determine the relative impact of a given failure mode of a given component onto the general asset risk of failure, or operational condition, or some other metric, as desired. An aggregation function may then be used to consider the relative contribution of all nodes 202 and sub-trees 208 in the fault tree structure 200. While this approach is objective, the individual criteria used to assess the impact of a given node 202 or a given failure mode may be more subjective, since experts may differ on the relevance of certain failure modes to each other, and may weigh them differently when constructing an aggregation function that defines these interrelationships.

Figure 2B:
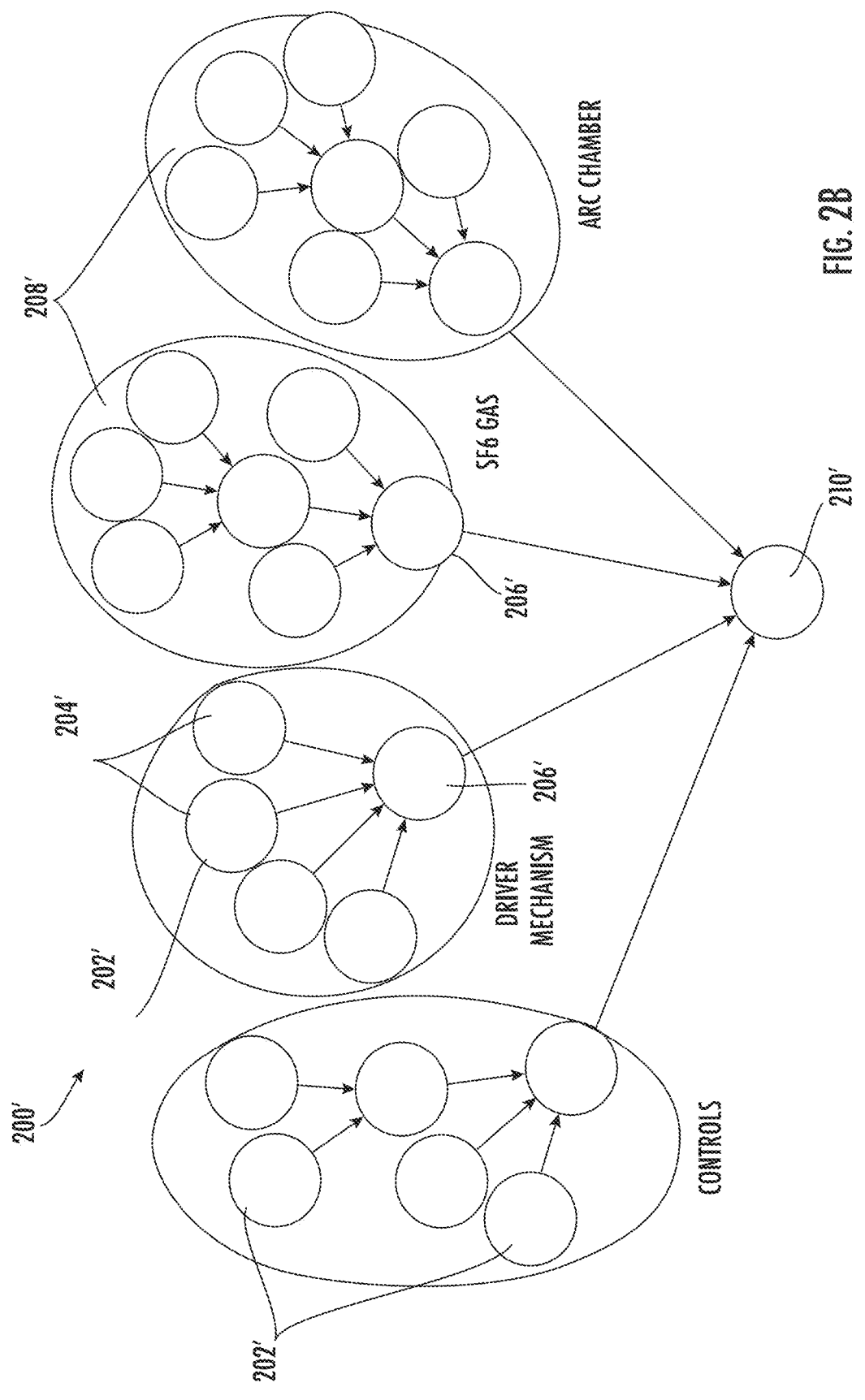
FIG. 2B is a diagram illustrating a configurable fault tree structure for a circuit breaker having multiple sub-trees, according to some embodiments.

As discussed above, fault tree structures may be used with many different types of electrical equipment, such as circuit breakers for example. In this regard, FIG. 2B illustrates a fault tree structure 200' for a circuit breaker that is subdivided into sub-trees 208' associated with different failure modes and/or sub-systems of the circuit breaker. In this example, the sub-trees 208' of nodes 202' (including respective parent nodes 206' and child nodes 204') grouped by types of failure modes for a SF6 gas circuit breaker, e.g., circuit breaker control, driver mechanism, SF6 gas, arc chamber, etc., each subdivided into respective components and/or failure modes, and each leading to a general failure mode 210' at the root of the fault tree structure 200'. It should be understood that similar fault tree structures may be used with other types of circuit breakers, such as mineral oil circuit breakers. For example, a similar fault tree structure for a mineral oil circuit breaker may include sub-trees for circuit breaker control, driver mechanism, mineral oil, arc chamber, etc., each subdivided into respective components and/or failure modes.

Figure 3:
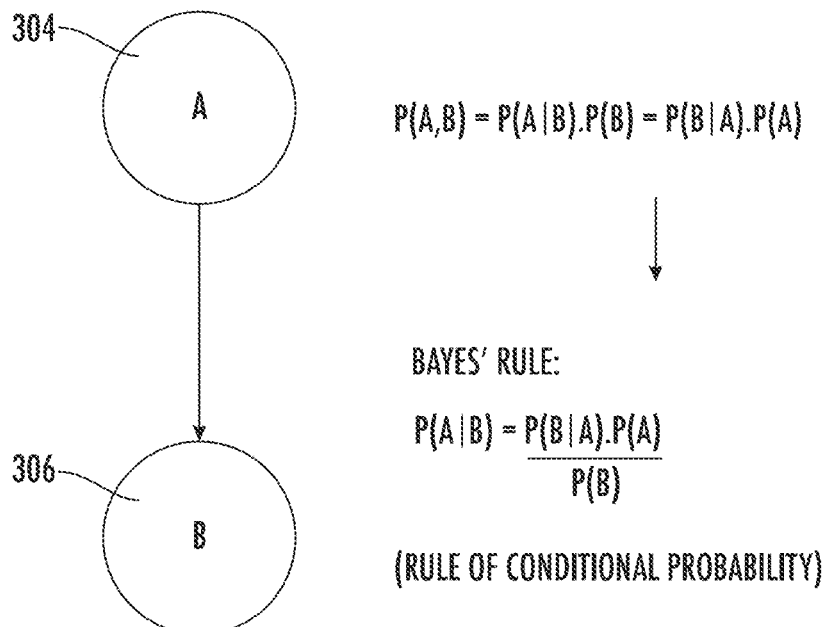
FIG. 3 is a diagram illustrating a probabilistic relationship between a parent node and a child node of a configurable fault tree structure, according to some embodiments.

In some embodiments, this subjective aspect of the analysis may be reduced, minimized, or eliminated, based on objective data and a statistical procedure based, for example, on Bayes Statistics and Bayesian Networks. For example, many potential faults are interrelated such that the occurrence of one affects the probability of the other and vice-versa. As shown by FIG. 3, the occurrence of event A in a child node 304 alters the probability of (i.e., changes the "belief" in) B in a parent node 306, and the occurrence of B in the parent node 306 also changes the belief in A in the child node 304. This principle, referred to as Bayes' rule, is illustrated by the following equation:

$$P(A|B) = \frac{P(B|A)*P(A)}{P(B)}$$

In this example, P(A) represents a prior probability of A, i.e., a belief in A, absent any additional evidence, and P(B) represents a marginal likelihood (which is constant) of B.

P(B|A) represents a probability of B in the event of A, and P(A|B) represents a new belief in A, based on new evidence of B (i.e., posterior).

Applying these principles to a fault tree structure, such as the fault tree structure 200, 200' of FIGS. 2A-2B, for example, each node in the fault tree structure may be associated with a probability of occurrence. Unlike a "deterministic" fault tree structure, in which a binary fault condition in a parent node automatically results in a fault condition in its child node(s), this "probabilistic" fault tree structure results in a complex Bayesian network, in which probabilities of faults in parent nodes 306 and child nodes 304 change based on probabilities and changes in probabilities in other interconnected parent nodes 306 and child nodes 304.

In some embodiments, prior probabilities for certain nodes may be obtained from or based on objective measurements, such as for example online sensors data, expert knowledge, and/or subjective opinion, etc. Even with imperfect initial prior probabilities, a probabilistic fault tree can generate statistically meaningful initial results, which may be automatically or dynamically updated and refined as additional, more objective data is received over time.

Initial likelihoods are constructed similarly, with the additional consideration of a number of "edges" that reach each node and their associated probabilities. As the number of edges, each with multiple possible states and associated probabilities, it becomes more and more difficult to identify all possible combinations of probabilities, and it may be preferable to substitute expert knowledge or subjective opinion at this initial stage. As with the probabilities above, the likelihoods would then be automatically or dynamically updated and refined as additional, more objective data is received over time.

Another factor to consider is that many components are known to fail in practice more often than others, which can lead to some sub-trees of the fault tree structure having more significance to the overall failure mode determination. By incorporating available failure statistics for different sub-trees, i.e., different failure modes, sub-systems, and/or functions, etc., the fault tree structure can be fine-tuned and refined over time.

Figure 4A:
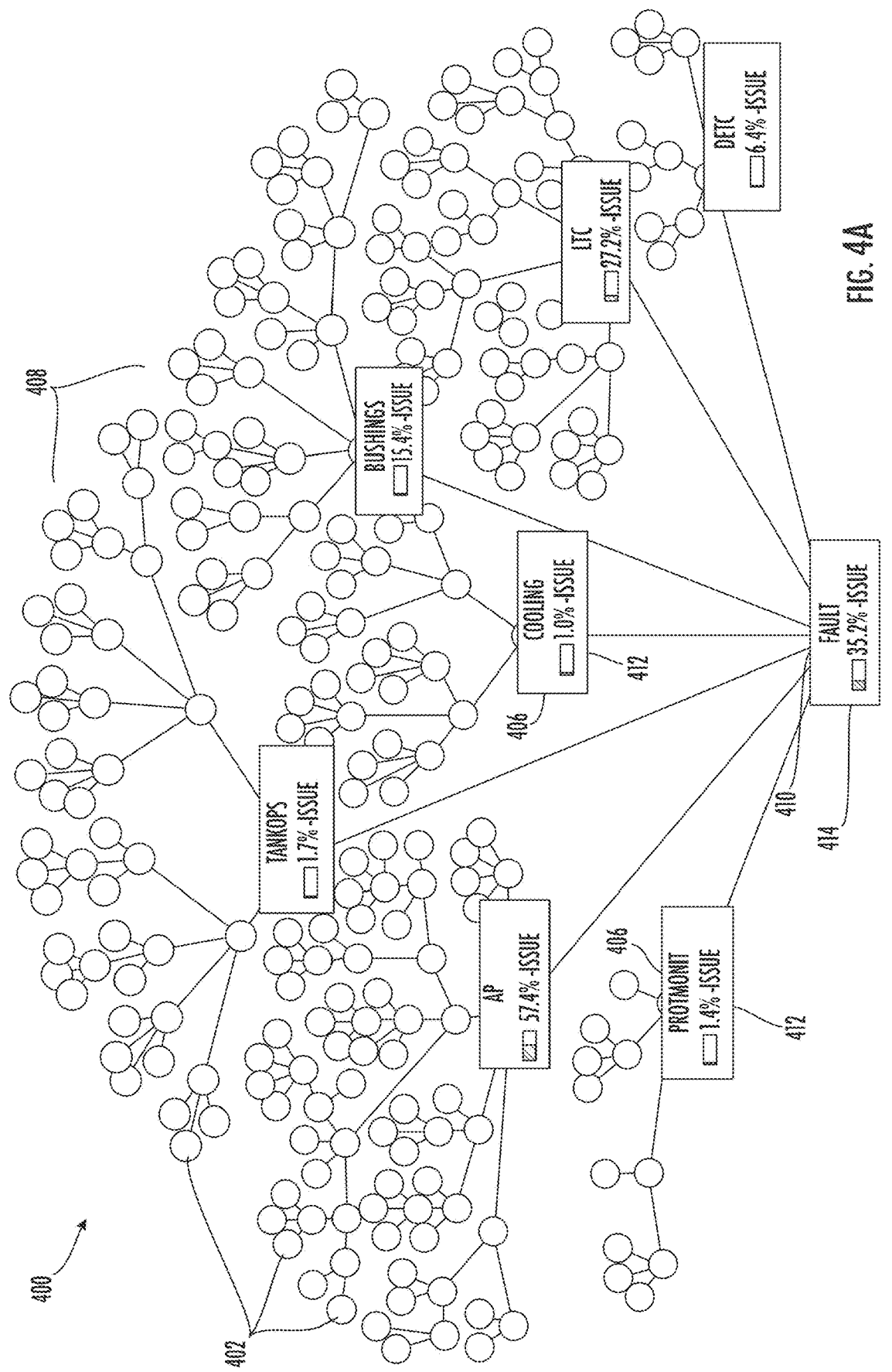
FIGS. 4A-4D are diagrams of a configurable fault tree structure illustrating probabilistic interactions.
Figure 4B:
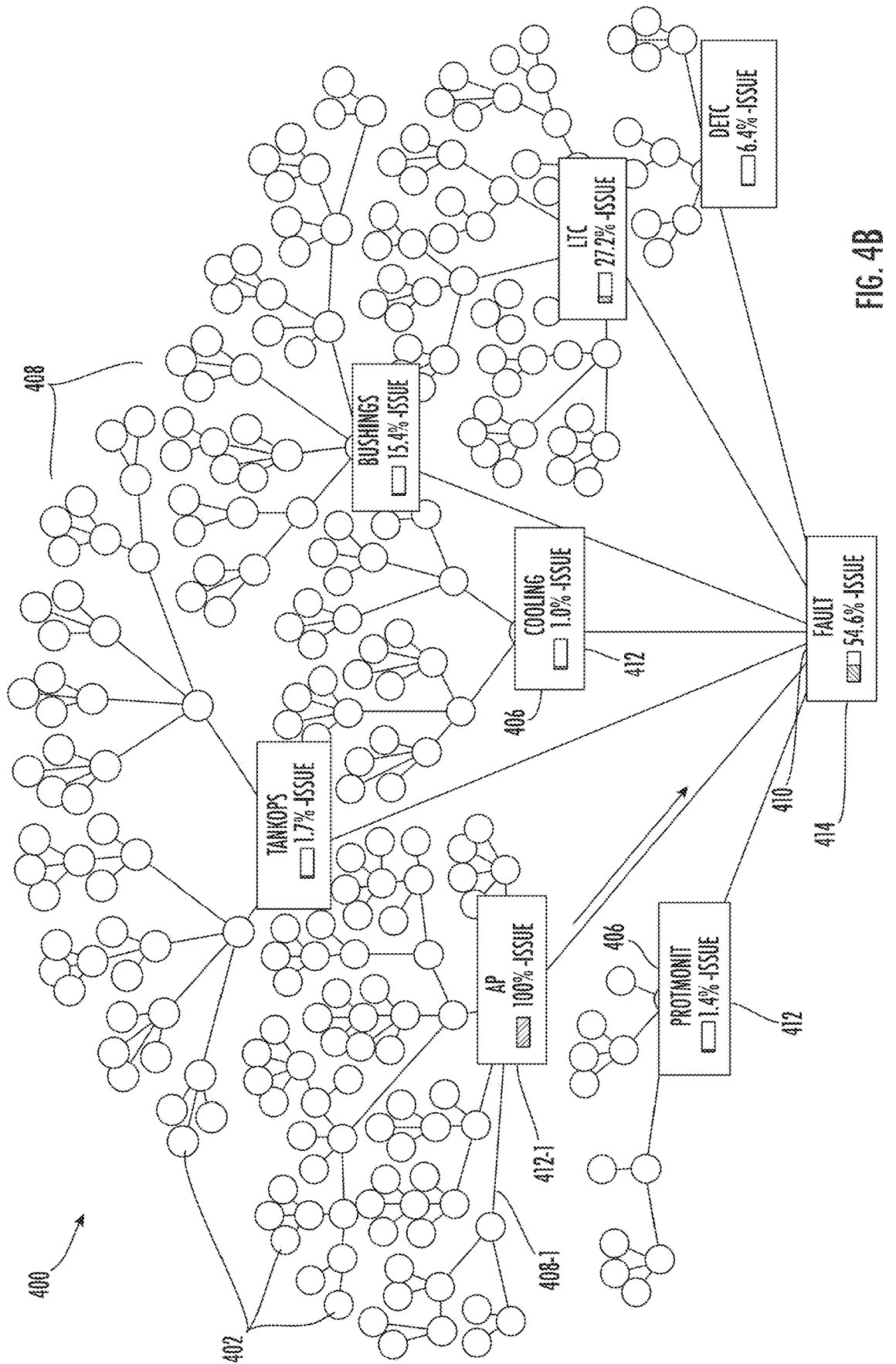
Figure 4C:
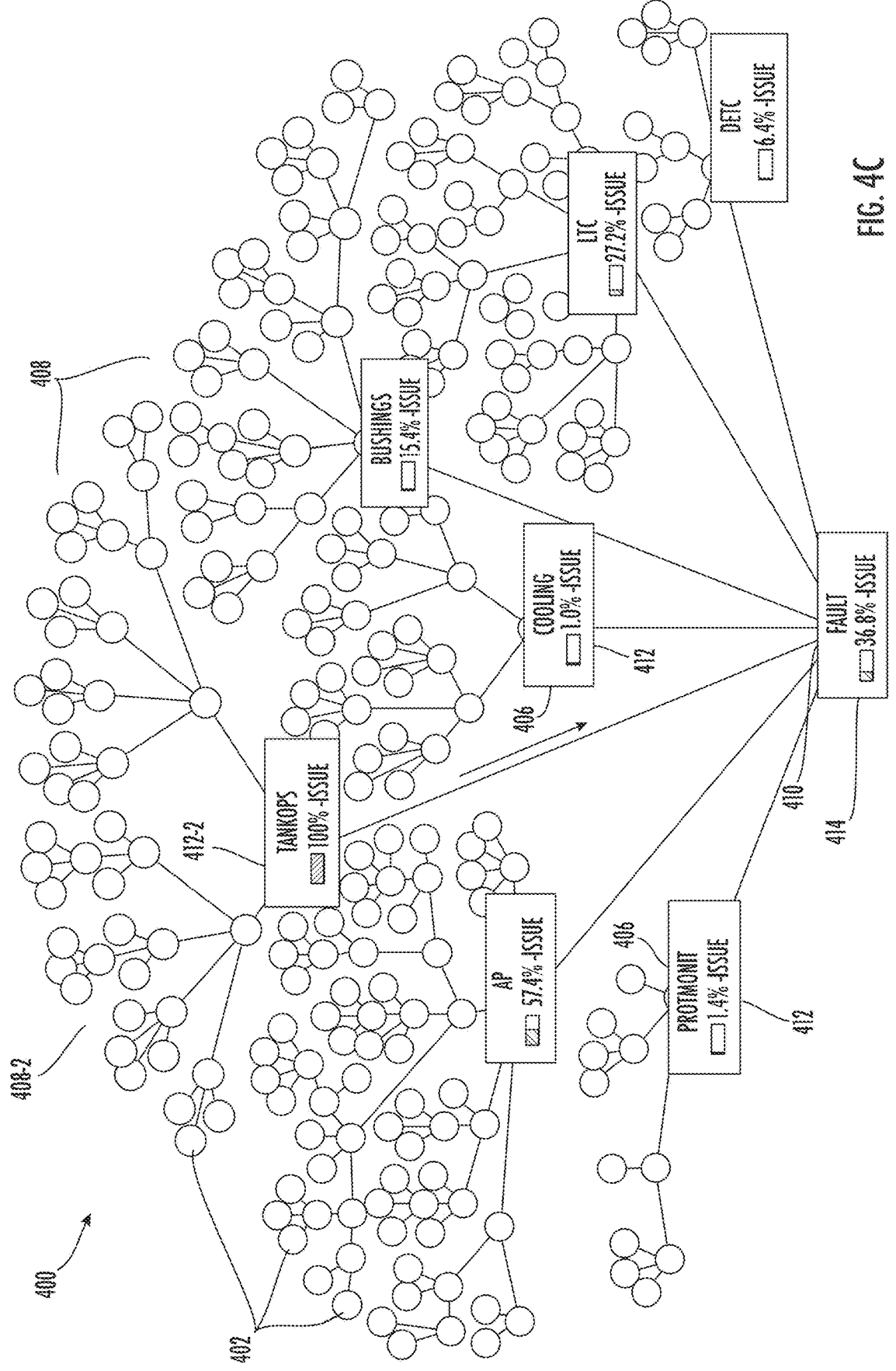
Figure 4D:
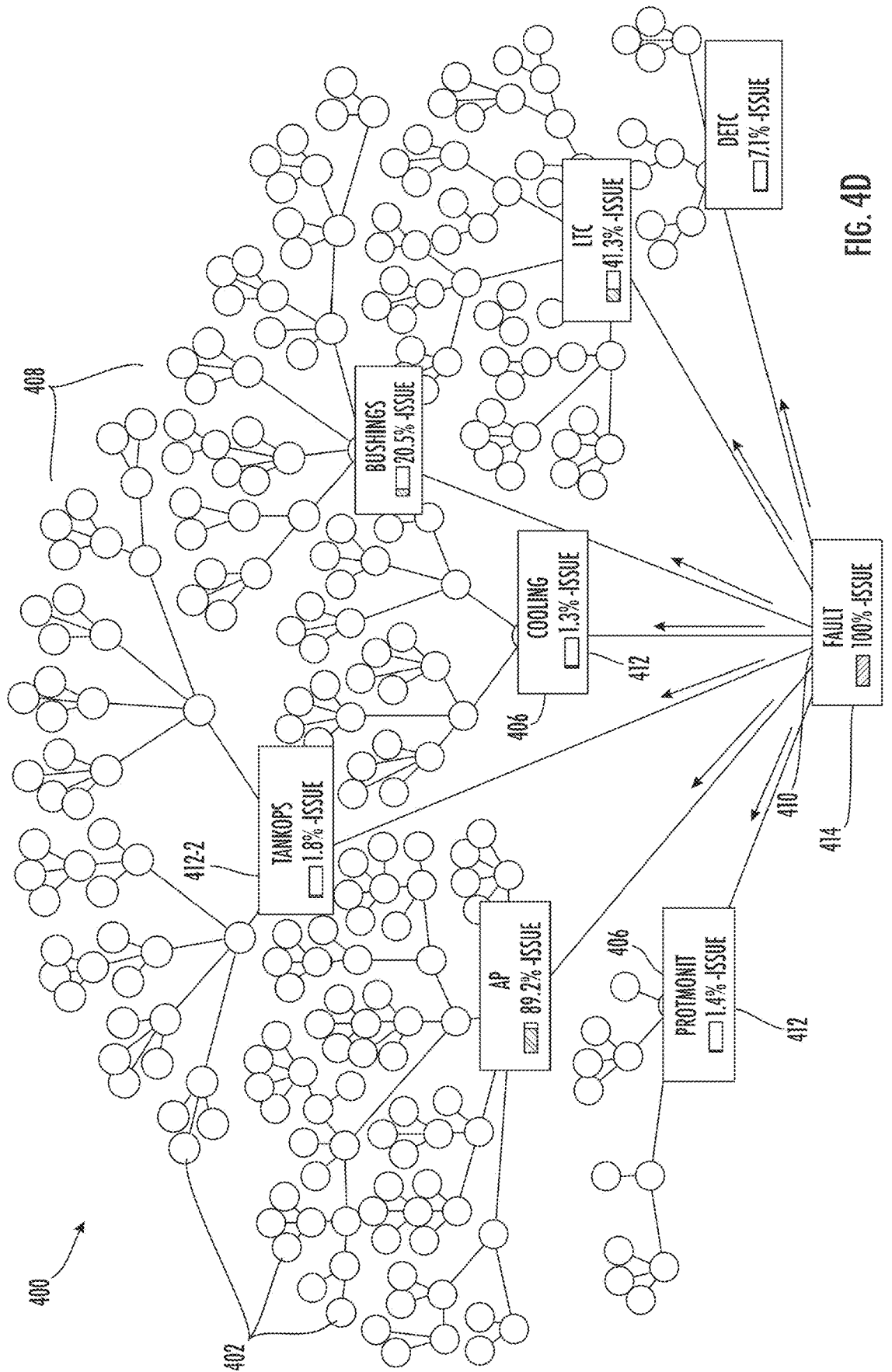

In this regard, another example of a fault tree structure 400 is illustrated in FIG. 4A. Each sub-tree 408 of nodes 402 of the fault tree structure 400 has an associated likelihood percentage 412 of a particular fault occurring (and conversely, not occurring), based on the probabilities associated with the various interconnected nodes 402, which in turn serve as probabilities for a likelihood 414 for a general failure node 410. As shown by FIG. 4B, in the event of an actual fault, for example, in the active part sub-tree 408-1 of the fault tree structure 400, the likelihood 412-1 of failure in that sub-tree 408-1 becomes 100% and the overall likelihood 414 of failure for the general failure node 410 increases significantly, when applying Bayes' rule, due to the critical nature of the active part to the overall functioning of the electrical equipment. As shown by FIG. 4C, an actual fault in another sub-tree 408-2, such as the tank and oil preservation system, may not be as definitive, and may increase that overall likelihood 414 of system fault for the general failure node 410 by a lesser amount. Probabilistic belief can also propagate in reverse order, as shown by FIG. 4D. For example, when evidence of an actual system fault occurs, the likelihood 414 of failure for the general failure node 410 becomes 100%, and this "diagnostic" evidence then propagates back to the different sub-trees 408, which both aids in diagnosing the cause of the fault, and updates and refines the model for the fault tree structure 400.

FIGS. 5A-5C illustrate flowcharts of operations 500 for adjusting probability values for a configurable fault tree, such as the fault tree structure 400 of FIGS. 4A-4D for example. Reference will also be made to FIGS. 6A-6D, which illustrate various modifications to a fault tree structure 600, including by the operations 500 of FIGS. 5A-5C.

Figure 6A:
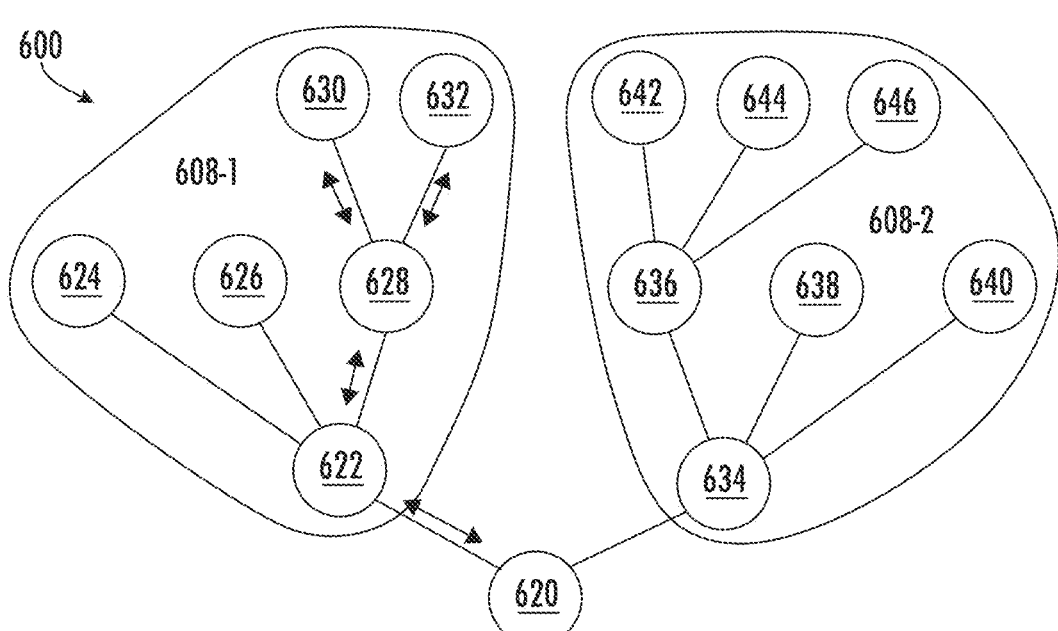
FIGS. 6A-6D are diagrams of a configurable fault tree structure illustrating modifications to the fault tree structure according to some embodiments.

Referring now to FIG. 5A, the operations 500 include adjusting at least one probability value associated with a state of at least one component of a first electrical equipment for a subset of nodes of a first plurality of interconnected nodes of a configurable fault tree structure (Block 502). In this example, the configurable fault tree structure represents at least one failure mode relating to the at least one component of the first electrical equipment. In this example as well, the adjusting is based on at least one of a detected state of the at least one component of the first electrical equipment and observed faults in a plurality of electrical equipment. For example, the fault tree structure 600 of FIG. 6A contains a plurality of interconnected nodes 620-646, with a first group of nodes 622-632 being associated with a first subsystem 408-1 of an electrical equipment and a second group of nodes 634-646 being associated with a second subsystem of the electrical equipment, with the parent nodes 622, 634 for the respective subsystems 608-1, 608-2 being children of the general failure node 620 for the electrical equipment. In the example of FIG. 6A, a detected state of a component of the electrical equipment associated with node 630 causes a probability value associated with node 628 to be adjusted, which in turn causes adjustments to the probability values in additional nodes (e.g., child node 632 and parent node 628 and so on) connected throughout the fault tree structure 600 to be adjusted.

The operations 500 further include generating an indication of the state of the at least one component of the first electrical equipment based on the at least one adjusted probability value (Block 504). The indication may include an audiovisual indication (e.g., an audio or visual alert indication) provided by a component of the electrical equipment or a computing device associated with the electrical equipment, for example. For example, in response to detected states of different components of the electrical equipment associated with different nodes, the general failure node 620 may trigger an alert or other indication of a general system fault. The trigger for an alert or indication can also be based on a determination of the probability value for a component and/or functionality (e.g. for node 622) to provide an alarm indicative of an increased probability of failure of the component and/or functionality associated with the node 622. The indication, alert, control, service action and/or other response based on the adjusted probability value can be configured for any node that is representing a component, subcomponent, or a function relating to the electrical equipment. Such configurations can be made according to the user requirements, general history of failure associated with the type of electrical equipment and/or their components, and/or their operating environment, for example.

In some embodiments, generating the indication may include determining whether the adjusted probability value meets a predetermined probability threshold, such that the indication is further based on the adjusted probability value meeting the predetermined probability threshold. For example, various physical parameters of the first electrical equipment, such as oil temperature, gas content, etc., may be detected directly, with more subjective parameters, such as relative health, state, condition etc., of the first electrical equipment may then be inferred from the indicated physical parameters meeting predetermined threshold values.

The operations 500 may further include configuring the configurable fault tree structure to represent failure modes of the first electrical equipment with a second plurality of interconnected nodes (Block 506). Configuring can include, for example, modifying probabilities associated with the nodes (discussed above with respect to FIG. 6A), modifying the number of nodes in the fault tree structure, and/or modifying the interconnections and relationships between individual nodes (as will be discussed below with respect to FIGS. 6B-6C). For example, the second plurality of interconnected nodes may represent additional nodes (e.g., one or more parts/sub sets integrated in the fault tree structure) that may be added to the configurable fault tree, or which may represent additional probability values, types of failure modes and/or components, or other criteria which may differ from the criteria of the first plurality of nodes.

Figure 6B:
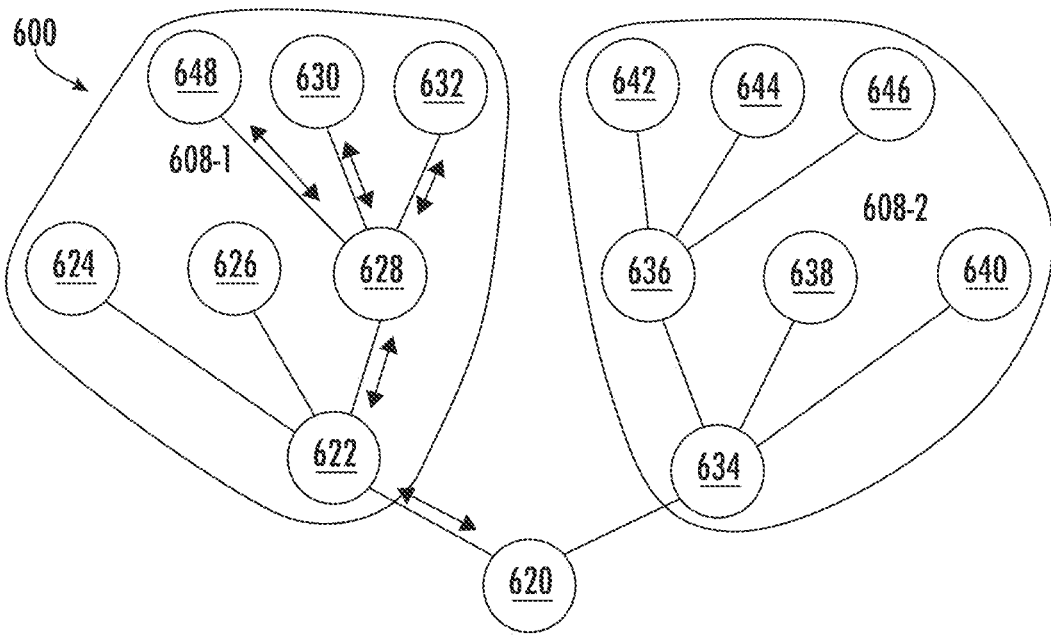

In some embodiments, configuring the configurable fault tree may include adding an additional node to the first plurality of interconnected nodes (Block 510), and determining an additional probability value for the additional node associated with a state of at least one component of the first electrical equipment (Block 512). Configuring the configurable fault tree may also include adjusting the adjusted probability value based at least in part on the determined additional probability value (Block 514). For example, FIG. 6B illustrates adding an additional node 648 associated with another component of the electrical equipment to the fault tree structure 600 as a child to node 628. A probability value associated with node 648 causes a probability value associated with node 628 to be adjusted (or further adjusted), which in turn causes probability values for child nodes 630, 632, and parent node 622 to be adjusted (or further adjusted), and so on.

Configuration of the configurable fault tree may be achieved in a number of ways. For example, the configuration may be initiated by a user, for example to replace and/or update the configurable fault tree with new nodes, modified or updated nodes, or with a new fault tree structure entirely, based on improvements, updates, standardizations, etc. which may be made to the nodes and/or fault tree structure. In some embodiments, certain nodes can be consolidated into a smaller number of useful nodes to simplify the operation of the system, for example in response to a comparison of the effectiveness of different fault tree structures being used on a plurality of different electrical equipment. In this regard, configuring the configurable fault tree may further include removing at least one node from the plurality of interconnected nodes (Block 516), and adjusting the adjusted probability value based at least in part on removing the at least one node from the plurality of interconnected nodes (Block 518).

Figure 6C:
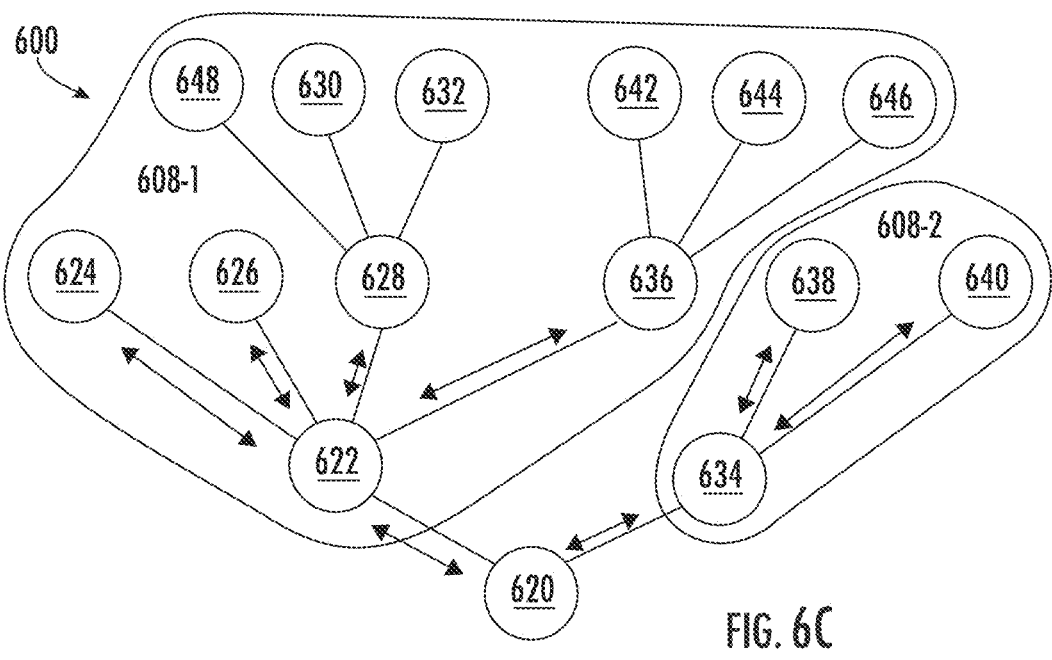
Figure 6D:
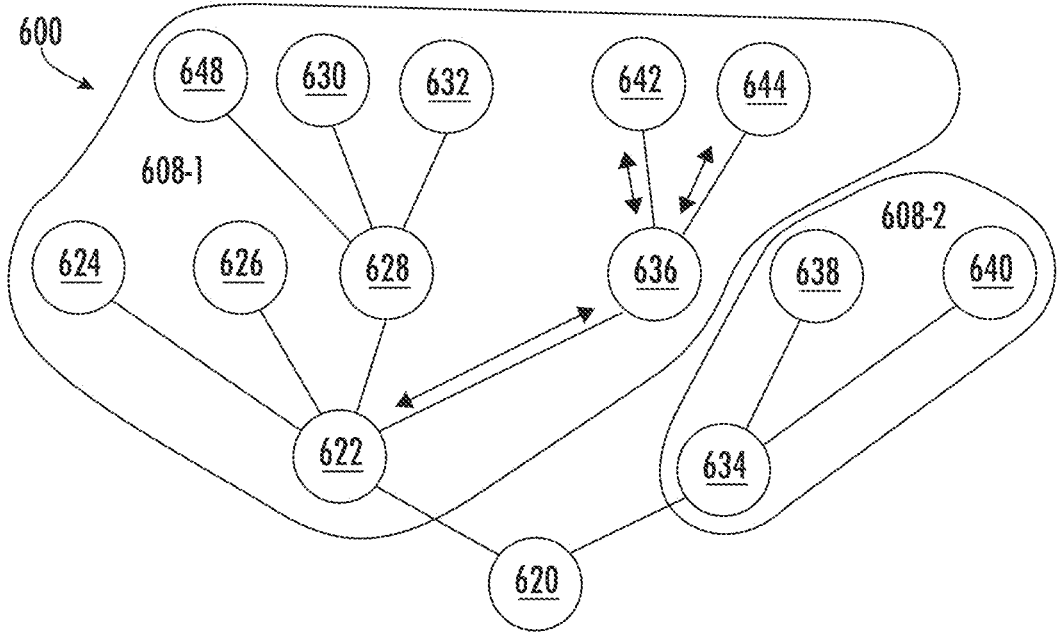

For example, FIG. 6C illustrates changing an interconnection between nodes 636 and 634 (which are part of subsystem 608-2 in this example) so that node 636 is now a child of node 622 (within subsystem 608-1). The addition of node 636 as a child to node 622 causes the probability value associated with node 622 to be adjusted (or further adjusted), which in turn propagates to the other nodes associated with subsystem 608-1, and eventually propagates throughout the fault tree structure 600. At the same time, the removal of node 636 as a child to node 634 causes the probability value associated with node 634 to be adjusted (or further adjusted) as well, which in turn propagates to the other nodes associated with subsystem 608-2, and also eventually propagates throughout the fault tree structure 600. FIG. 6D illustrates another example in which node 646 is removed as a child of node 636, which causes a probability value associated with node 636 to be adjusted (or further adjusted), which in turn causes probability values for the remaining child nodes 642, 644, and parent node 622 to be adjusted (or further adjusted), and so on.

By validating different fault tree structures, aspects of those fault tree structures may have greater performance and higher accuracy can be incorporated into other fault tree structures, and/or standardized across the plurality of electrical equipment, for example. One advantage of configuring the configurable fault tree structure in this manner is that an open system, in which different users can configure, update, customize, or standardize aspects of the configurable fault tree structure in full or in part, can be utilized, rather than shielding the internal functionality of the fault tree structure within a proprietary and inaccessible black box environment. In another embodiment, the fault tree structure can be made available on subscription basis to users through a standard/expert body or industry such that the fault tree structure can be integrated in the individual electrical equipment monitoring system which provides the detected states, measured values or processed values for nodes of the fault tree to compute probability of failure of various components in the monitored electrical equipment. The association of the measured or processed value/detected states with the nodes may be made through suitable tags provided in a data model to communicate and integrate so provided fault tree structures into the electrical equipment monitoring system.

Referring now to FIG. 5B, in some embodiments, the operations 500 may further include generating, before adjusting the probability value, the probability value for the subset of nodes based on at least one probability value associated with at least one other node of the plurality of interconnected nodes (Block 520).

The operations 500 may further include detecting an updated state of at least one component of the first electrical equipment (Block 522), and adjusting the adjusted probability value based at least in part on the detected updated state (Block 524). In some embodiments, operations 500 may further include generating an updated indication of the updated state of the at least one component of the electrical equipment (Block 526), in response to the further adjusted probability value. For example, referring again to the fault tree structure 600 of FIGS. 6A-6D, some or all of the nodes 620-648 can be periodically or continuously adjusted based on detected updated states for components of the electrical equipment associated with different nodes.

Referring now to FIG. 5C, in some embodiments, adjusting the probability value further includes adjusting a first probability value for a first node of the plurality of interconnected nodes based at least in part on a received second probability value for a second node of the plurality of interconnected nodes (Block 530), and adjusting the second probability value for the second node based at least in part on the adjusted first probability value for the first node (Block 532). For example, referring again to the fault tree structure 600 of FIGS. 6A-6D, as the probability values associated with individual nodes 620-648 are updated, these updated probability values cause probability values in connected (parent and/or child) nodes to be updated accordingly.

The operations 500 may further include adjusting an operational state of at least one component of the first electrical equipment based at least in part on the indication (Block 534). For example, in an example of a transformer, the transformer may be configured to operate a cooling component and/or subsystem in response to a fault indication indicative of a hotspot temperature exceeding a permissible threshold value.

In some embodiments, the operations 500 may use the same fault tree principle but with a structure for each electrical equipment. For example, a default tree can be customized by different customers with the customizations, such as new probabilities for certain nodes, being made available for some or all of the other customers using the fault tree structure, thereby facilitating cross-company collaboration to make collective improvements to the fault tree structure for the benefit of all customers, or a subset of customers enrolled in a particular product or service tier, for example. The customer may employ the service where the configurable fault tree structure can be customized for customers based on the electrical equipment make (similar make) or use in similar environmental or similar load conditions. Such collaboration may also be useful when additional/refined nodes of the fault tree structure are available, when there are new causes of failure identified or to new understandings of performance/quality of specific processing techniques. Such collaboration may also be useful based on specific material usage in the equipment, specific design, methods of development/implementation, or specific maintenance carried out for the components of the electrical equipment.

In some examples, the fault tree structure may be configured and/or updated using multiple sources, with periodic and/or continuous updates. In some examples, the fault tree structure may be configured and/or updated in response to meeting certain criteria or thresholds, such as detected faults and/or sufficiently high probabilities of faults in a threshold number of nodes, for example. In some examples, only a part of a fault tree can be used by a customer, wherein the part of the fault tree (subsets) are selected by the customer (electrical equipment user/manufacturer/service provider) according to the parameters being monitored in the electrical equipment. The fault tree for the electrical equipment can be upgraded/downgraded according to the upgrades/downgrades made in number of parameters being monitored. In some examples, a customer may want to subscribe and utilize more than one fault tree (which may be independently developed and/or maintained, for example) to improve confidence in determination of a failure probabilities before engaging into a critical service for the electrical equipment as part of their asset management strategy. The utilization of the fault tree structure is based on a data model (which may be standardized/published) made available for integration to the electrical monitoring system/sensors/devices associated with the electrical equipment. The data model can specify means to communicate and exchange information relating to fault tree and outcomes from usage of the fault tree.

In this embodiment, a first message may be received from the first electrical equipment indicative of a state of the at least one component of the first electrical equipment. For example, a system storing the fault tree structure in memory, such as the system 700 described below with respect to FIG. 7, may receive the first message from the first electrical equipment, and adjust the probability value is further based at least in part on the first message. The system may also receive a second message from a second electrical equipment indicative of a state of a second component of the second electrical equipment and adjust a second probability value associated the state of the second component based at least in part on the second message. In this manner, different electrical equipment, which may be remotely located from each other and which may be operated by different entities, can use, update, and contribute to the ongoing configuration and refinement of the fault tree structure over time. The updated fault tree structure with failure probability values associated with various nodes of the fault tree can be used by individual entities, such as by providing the detected state/measured or processed values to compute component level, function level or overall probability of failure, and to plan service/maintenance activities accordingly for the component and/or equipment.

Figure 7:
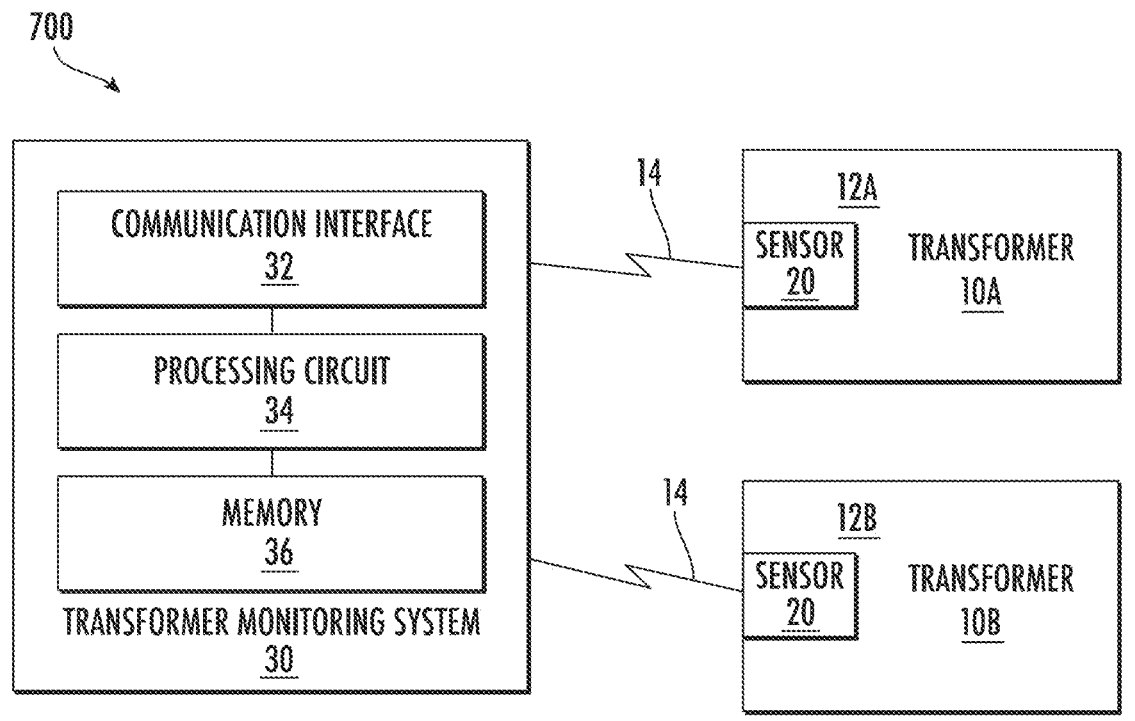
FIG. 7 is a block diagram of a transformer fault detection system that employs a configurable fault tree structure, according to some embodiments.

FIG. 7 is a block diagram of a transformer fault detection system 700 that employs a configurable fault tree structure that is open and accessible by a plurality of electrical equipment, which may be associated with multiple users or customers, for example. The example is illustrated with a transformer monitoring system 30 but the embodiments presented work also for an electrical equipment or power system monitoring system which may be used to monitor plurality of electrical equipment and power lines to manage power (including failures in electrical equipment and distribution power lines) in the power system.

In this example, the fault detection system 700 transformer monitoring system 30 can monitor one or multiple transformers 10A, 10B. In some embodiments, the transformer monitoring system 30 is integrated within a transformer 10A provided as a device for monitoring and fault detection, while in other embodiments, the transformer monitoring system 30 is separate from the transformers 10A, 10B being monitored.

The transformer fault detection system 700 includes a processor circuit 34, a communication interface 32 coupled to the processor circuit, and a memory 36 coupled to the processor circuit 34. The memory 36 includes machine-readable computer program instructions that, when executed by the processor circuit 34, cause the processor circuit 34 to perform some of the operations depicted and described herein. For example, the fault detection system 700 may perform operations 500 as described above with respect to FIG. 5.

As shown, the fault detection system 700 includes a communication interface 32 (also referred to as a network interface) configured to provide communications with other devices, e.g., with sensors 20 in the transformers 10A, 10B via a wired or wireless communication channel 14.

The fault detection system 700 also includes a processor circuit 34 (also referred to as a processor) and a memory 36 (also referred to as memory) coupled to the processor circuit 34. According to other embodiments, processor circuit 34 may be defined to include memory so that a separate memory circuit may not be required.

As discussed herein, operations of the fault detection system 700 may be performed by processor circuit 34 and/or communication interface 32. For example, the processor circuit 34 may control the communication interface 32 to transmit communications through the communication interface 32 to one or more other devices and/or to receive communications through network interface from one or more other devices. Moreover, modules may be stored in memory 36, and these modules may provide instructions so that when instructions of a module are executed by processor circuit 34, processor circuit 34 performs respective operations (e.g., operations discussed herein with respect to example embodiments). For example, modules may be configured to manage fault detection, generate updated probabilities for different nodes, provide an interface (e.g., an application programming interface (API)) for managing, configuring and/or modifying the fault tree structure, using a data model and/or communication protocol for accessing/ integrating various elements of the fault detection system, etc. by a customer or other user.

The transformer 10A, 10B, which may for example be a high voltage transformer, includes a sensor 20 that measures various quantities associated with the transformer 10A, 10B such as operating load, ambient temperature, moisture and/ or oxygen content, and transmits the measurements via communication channel 14 to the transformer monitoring system 30. These measured quantities can be used by the transformer monitoring system 30 to detect and/or determine the presence of faults in various components or subsystems of the transformer 10A, and/or a general fault condition of the transformer 10A, 10B. The communication channel 14 may include a wired or wireless link, and in some embodiments may include a wireless local area network (WLAN) or cellular communication network, such as a 4G or 5G communication network.

The fault detection system 700 may receive on-line or off-line measurements of operating load, temperature, moisture, oxygen content, etc. from the transformer 10A, 10B and process the measurements to detect and/or determine the presence of faults. The fault detection system 700 may be implemented in a server, in a server cluster, a cloud-based remote server system, and/or a standalone device. Sensor data may be obtained by the fault detection system 700 from one transformer and/or from multiple transformers.

A fault detection system 700 as described herein may be implemented in many different ways. For example, a transformer monitoring system 30 according to some embodiments may receive online/offline data, and the received data used by a machine learning technique configured in the device for learning and classification to identify different patterns that can be considered for estimation/simulations described in various embodiments. The device may be connectable to one or more transformers 10 to receive measurement data.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items. The phrase "at least one of A and B" means "A or B" or "A and B".

It will be understood that although the terms first, second, third, etc. may be used herein to describe various elements/ operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processor circuit to produce a machine, such that the instructions, which execute via the processor of the computer and/or other programmable data processing apparatus, transform and control transistors, values stored in memory locations, and other hardware components within such circuitry to implement the functions/ acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks, such as applying the concept of failure modes effect and analysis (FMEA) of a reliability centered maintenance (RCM) process. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents and shall not be restricted or limited by the foregoing detailed description.

The invention claimed is:

1. A method comprising:
adjusting, by a processor circuit, at least one probability value associated with a state of at least one component of a first electrical equipment for a subset of nodes of a first plurality of interconnected nodes of a configurable fault tree structure representing at least one failure mode relating to the at least one component of the first electrical equipment, the adjusting based on at least one of a detected state of the at least one component of the first electrical equipment and observed faults in a plurality of electrical equipment;
generating, by the processor circuit, an indication of the state of the at least one component of the first electrical equipment based on the at least one adjusted probability value; and
adjusting, by the processor circuit, an operational state of at least one component of the first electrical equipment based at least in part on the indication.

2. The method of claim 1, further comprising configuring the configurable fault tree structure to represent failure modes of the first electrical equipment with a second plurality of interconnected nodes.

3. The method of claim 2, wherein configuring the configurable fault tree structure further comprises:
adding, by the processor circuit, an additional node to the first plurality of interconnected nodes;
determining, by the processor circuit, an additional probability value for the additional node associated with a state of at least one component of the first electrical equipment; and
adjusting, by the processor circuit, the at least one adjusted probability value based at least in part on the determined additional probability value.

4. The method of claim 2, wherein configuring the configurable fault tree structure further comprises:
removing, by the processor circuit, at least one node from the first plurality of interconnected nodes; and
adjusting, by the processor circuit, the at least one adjusted probability value based at least in part on removing the at least one node from the first plurality of interconnected nodes.

5. The method of claim 1, further comprising:
generating, by the processor circuit before adjusting the at least one probability value, the at least one probability value for the subset of nodes based on at least one probability value associated with at least one other node of the first plurality of interconnected nodes.

6. The method of claim 1, further comprising:
determining, by the processor circuit, whether the at least one adjusted probability value meets a predetermined probability threshold, wherein generating the indication is further based on the at least one adjusted probability value meeting the predetermined probability threshold.

7. The method of claim 1, further comprising:
detecting, by the processor circuit, an updated state of at least one component of the first electrical equipment; and
adjusting, by the processor circuit, the at least one adjusted probability value based at least in part on the detected updated state.

8. The method of claim 7, further comprising:
generating, by the processor circuit in response to the at least one further adjusted probability value, an updated indication of the updated state of the at least one component of the first electrical equipment.

9. The method of claim 1, wherein adjusting the probability value further comprises:
adjusting a first probability value for a first node of the first plurality of interconnected nodes based at least in part on a received second probability value for a second node of the first plurality of interconnected nodes; and
adjusting the second probability value for the second node based at least in part on the adjusted first probability value for the first node.

10. The method of claim 1, further comprising:
receiving, by a system comprising the processor circuit and a memory storing the fault tree structure, a first message from the first electrical equipment indicative of the state of the at least one component of the first electrical equipment; and
transmitting, by the system, a second message comprising the indication to the first electrical equipment.

11. The method of claim 1, further comprising:
receiving, by a system comprising the processor circuit and a memory storing the fault tree structure, a first message from the first electrical equipment indicative of a state of the at least one component of the first electrical equipment, wherein adjusting the probability value is further based at least in part on the first message;
receiving, by the system, a second message from a second electrical equipment indicative of a state of a second component of the second electrical equipment; and
adjusting, by the processor circuit, a second probability value associated with the state of the second component based at least in part on the second message.

12. A system comprising:
a processor circuit; and
a memory comprising machine readable instructions that, when executed by the processor circuit, cause the processor circuit to:
adjust at least one probability value associated with a state of at least one component of a first electrical equipment for a subset of nodes of a first plurality of interconnected nodes of a configurable fault tree structure representing at least one failure mode relating to the at least one component of the first electrical equipment, the adjusting based on at least one of a detected state of the at least one component of the first electrical equipment and observed faults in a plurality of electrical equipment;

generate an indication of the state of the at least one component of the first electrical equipment based on the at least one adjusted probability value; and adjust an operational state of at least one component of the first electrical equipment based at least in part on the indication.

13. The system of claim 12, wherein the memory further comprises the fault tree structure.

14. The system of claim 12, wherein the machine readable instructions further cause the processor circuit to:

configure the configurable fault tree structure to represent failure modes of the first electrical equipment with a second plurality of interconnected nodes.

15. The system of claim 12, wherein the machine readable instructions further cause the processor circuit to:

generate, before adjusting the probability value, the probability value for the subset of nodes based on at least one probability value associated with at least one other node of the first plurality of interconnected nodes.

16. The system of claim 12, wherein the machine readable instructions further cause the processor circuit to:

determine whether the at least one adjusted probability value meets a predetermined probability threshold, wherein generating the indication is further based on the at least one adjusted probability value meeting the predetermined probability threshold.

17. A non-transitory computer readable medium comprising instructions that, when executed by a processor circuit, cause the processor circuit to:

adjust at least one probability value associated with a state of at least one component of a first electrical equipment for a subset of nodes of a first plurality of interconnected nodes of a configurable fault tree structure representing at least one failure mode relating to the at least one component of the first electrical equipment, the adjusting based on at least one of a detected state of the at least one component of the first electrical equipment and observed faults in a plurality of electrical equipment;

generate an indication of the state of the at least one component of the first electrical equipment based on the at least one adjusted probability value; and adjust an operational state of at least one component of the first electrical equipment based at least in part on the indication.

18. The computer readable medium of claim 17, further comprising the fault tree structure.

19. The computer readable medium of claim 17, wherein the instructions further cause the processor circuit to:

configure the configurable fault tree structure to represent failure modes of the first electrical equipment with a second plurality of interconnected nodes.

* * * * *